United States Patent [19]
Lu et al.

[11] Patent Number: 5,968,722
[45] Date of Patent: Oct. 19, 1999

[54] BIAXIALLY ORIENTED SHEET PHOTOGRAPHIC FILM FOR BETTER PHOTOFINISHING

[75] Inventors: Pang-Chia Lu; Robert P. Bourdelais, both of Pittsford; Thaddeus S. Gula, Rochester, all of N.Y.

[73] Assignee: Eastman Kodak Company, Rochester, N.Y.

[21] Appl. No.: 09/099,810

[22] Filed: Jun. 19, 1998

[51] Int. Cl.$^6$ .............................. G03C 1/79; G03C 1/81; B32B 3/26; B32B 23/08
[52] U.S. Cl. .................. 430/496; 428/315.9; 428/513; 347/106; 430/201; 430/536; 430/538; 430/930
[58] Field of Search ..................... 430/536, 538, 430/930, 496, 201; 428/315.9, 513; 347/106

[56] References Cited

U.S. PATENT DOCUMENTS

| | | | |
|---|---|---|---|
| Re. 34,742 | 9/1994 | Maier et al. | 428/36.5 |
| 3,841,943 | 10/1974 | Takushi et al. | 156/494 |
| 3,944,699 | 3/1976 | Mathews et al. | 428/220 |
| 4,187,113 | 2/1980 | Mathews et al. | 430/533 |
| 4,283,486 | 8/1981 | Aono et al. | 430/538 |
| 4,377,616 | 3/1983 | Ashcraft et al. | 428/213 |
| 4,582,785 | 4/1986 | Woodward et al. | 430/538 |
| 4,632,869 | 12/1986 | Park et al. | 428/315.5 |
| 4,758,462 | 7/1988 | Park et al. | 428/213 |
| 4,774,224 | 9/1988 | Campbell | 430/945 |
| 4,994,147 | 2/1991 | Foley et al. | 162/137 |
| 5,011,814 | 4/1991 | Harriason | 503/227 |
| 5,096,875 | 3/1992 | Martin | 503/227 |
| 5,244,861 | 9/1993 | Campbell et al. | 430/201 |
| 5,288,690 | 2/1994 | Warner et al. | 428/141 |
| 5,389,422 | 2/1995 | Okazaki et al. | 428/141 |
| 5,425,990 | 6/1995 | Blum et al. | 428/337 |
| 5,466,519 | 11/1995 | Shirakura et al. | 430/538 |
| 5,514,460 | 5/1996 | Surman et al. | 428/304.4 |
| 5,888,643 | 3/1999 | Aylward et al. | 430/536 |
| 5,888,683 | 3/1999 | Gula et al. | 430/536 |

FOREIGN PATENT DOCUMENTS 0 803 377 A1  3/1994  European Pat. Off. .

*Primary Examiner*—Richard L. Schilling
*Attorney, Agent, or Firm*—Paul A. Leipold

[57] ABSTRACT

The invention relates to a imaging element comprising a laminated base structure wherein said base structure comprises a paper having laminated to the upper side and upper biaxially oriented polyolefin sheet and laminated to the lower side of said paper a lower side biaxially oriented polymer sheet wherein said lower side biaxially oriented polymer sheet has an energy to break of less than $3.5 \times 10^7$ J/m$^3$ in at least one direction.

19 Claims, No Drawings

BIAXIALLY ORIENTED SHEET PHOTOGRAPHIC FILM FOR BETTER PHOTOFINISHING

FIELD OF THE INVENTION

This invention relates to imaging materials. In a preferred form it relates to base materials for photographic papers.

BACKGROUND OF THE INVENTION

It has been proposed in U.S. Pat. No. 5,244,861 to utilize biaxially oriented polypropylene laminated to cellulose photographic grade paper for use as a reflective receiver for thermal dye transfer imaging processes. In this invention low density polyethylene is melt extrusion coated onto the backside of the reflective receiver to balance the reflective receiver for curl, provide waterproofing to the paper, and provide the proper backside roughness for printer transport.

In the formation of photographic papers, where a light sensitive emulsion layer containing gelatin is coated onto the base paper that has been extrusion coated with low density polyethylene resin, there is a need to provide a base paper with improved resistance to curl. When the relative humidity is greater than 50% or less than 20%, as is common in the storage of photographic images, the curl of photographic paper interferes with the viewing of images. A solution to the photographic curl problem has been proposed in U.S. application 08/864,228 filed May 23, 1997. In that invention, a mechanism to reduce curl in relative humidity greater than 50% or less than 20% is accomplished by applying a biaxially oriented polymer sheet to the backside of the paper base to balance the forces caused by the expansion and contraction of the emulsion layer in a relative humidity environment greater than 50% or less than 20%.

During photofinishing of traditional photographic papers, traditional polyethylene coated silver halide photographic paper is chopped in the cross direction as slit rolls of photographic paper are printed with consumer images. Since there is no worldwide photofinishing standard for chopping mechanisms, there exists many different types of chopping mechanisms that are used in photofinishing equipment around the world to chop rolls of slit photographic paper into consumer images. The chopping mechanisms differ in chopping rate, knife geometry, and force applied to the chopping knife. While the invention proposed in U.S. application 08/864,228 filed May 23, 1997, now U.S. Pat. No. 5,902,720, does significantly reduce image curl, it has been found that the biaxially oriented polymer sheet on the bottom side can interact with some chopping mechanisms, such as the slow speed rotary knife in the Gretag 750 Masterlab printer, and as a result leave undesirable fibrous projections along the chopped edge which significantly reduce the commercial value of the image. It would be desirable if a bottom side biaxially oriented sheet could be formed with the desired strength properties to control image curl and improved to provide efficient chopping in the cross direction.

During photofinishing, traditional polyethylene coated silver halide photographic paper is punched with an index hole which is used as a chopping locator during the finishing operation as slit rolls of photographic paper are printed with consumer images. Since there is no worldwide photofinishing standard for punching mechanisms, there exists many different types of punching mechanisms that are used in photofinishing equipment around the world. The punching mechanisms differ in punch geometry, punch force, and punching rate. While it has been found that the lamination of a biaxially oriented sheet to the bottom side does significantly improve image curl, the additional strength added to the imaging support with the biaxially oriented polymer sheet does increase the force to complete a successful punch. An inaccurate or incomplete punched hole will lead to undesirable results in the photofinishing operation as the photofinishing equipment will not image in the proper location and jams can occur which significantly reduce the efficiency of the photofinishing operation. It would be desirable if a bottom side film could be improved to aid in efficient photofinishing punching.

In the formation of reflective receivers for digital imaging systems such as Ink Jet and Thermal Dye Transfer, there is also need to reduce the curl of the image. Lamination of a high strength biaxially oriented polyolefin sheet to the backside of the image does improve the curl over the common practice of melt extrusion coating a layer of polyolefin. Reflective receivers for digital imaging systems that have biaxially oriented sheets to control curl can be difficult to convert from wide roll format into imaging sheet formats. Converting difficulties resulting from a high strength bottom biaxially oriented polymer sheet could result in fibrous projections on the cut sheet that can reduce the commercial value of the reflective receiver. For Ink Jet and Thermal Dye Transfer receivers it would be desirable if a bottom biaxially oriented polymer sheet could be formed with the strength properties to control curl and provide improved cross direction cutting for efficient slitting of the receiver in manufacturing.

PROBLEM TO BE SOLVED BY THE INVENTION

There is a need to provide improved cross direction cutting of imaging members that have a base that contains at least one layer of biaxially oriented polymer sheet. There is also a need to provide improved punching of holes during photofinishing for imaging members that have a base that contains at least one layer of biaxially oriented polymer sheet.

SUMMARY OF THE INVENTION

It is an object of the invention to overcome disadvantages of prior imaging members utilizing biaxially oriented polymer sheets.

It is another object to provide cross direction cutting of photographic materials without leaving undesirable fibrous projections.

It is a further object to provide punched holes during photofinishing that are accurately and reliably formed during photofinishing.

These and other objects of the invention generally are accomplished by an imaging element comprising a laminated base structure wherein said base structure comprises a paper having laminated to the upper side an upper biaxially oriented polyolefin sheet and laminated to the lower side of said paper a lower side biaxially oriented polymer sheet wherein said lower side biaxially oriented polymer sheet has an energy to break of less than $3.5 \times 10^7 J/m^3$ in at least one direction.

ADVANTAGEOUS EFFECT OF THE INVENTION

The invention provides an improved base for the casting of photosensitive layers. It particularly provides an improved base for color photographic materials with a bottom biaxially oriented polymer sheet with the required energy to break for efficient chopping, punching, and slitting in photoprocessing equipment.

DETAILED DESCRIPTION OF THE INVENTION

The invention has numerous advantages over prior practices in the art. The invention provides improved cross direction cutting of imaging members where the base of the imaging member comprises at least one sheet of biaxially oriented polymer such that upon cutting the edge is clean and does not exhibit undesirable fiber projections. Further, the imaging elements of the invention are easily and accurately punched for index holes by photofinishing machines. The imaging elements of the invention further exhibit the advantages of being resistant to curl, being writable on the backside, easily carrying indicia printed on the backside, and being resistant to tear. Another advantage of a bottom sheet that allowed for more efficient chopping and punching would be a reduction in the frequency at which these expensive mechanisms are changed as they mechanically wear after many actuation. These and other advantages will be apparent from the detailed description below.

The terms as used herein, "top", "upper", "emulsion side", and "face" mean the side or toward the side of a photographic member bearing the imaging layers. The terms "bottom", "lower side", and "back" mean the side or toward the side of the photographic member opposite from the side bearing the photosensitive imaging layers or developed image. Cross direction as used herein is generally perpendicular to the direction the web moved during formation of the imaging element or photographic member. Machine direction as used herein is the direction the web of imaging element or photographic member moved during formation.

Any suitable biaxially oriented polyolefin sheet may be used for the sheet on the top side of the laminated base of the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in U.S. Pat. Nos. 4,377,616; 4,758,462; and 4,632,869.

The core of the preferred composite top sheet should be from 15 to 95% of the total thickness of the sheet, preferably from 30 to 85% of the total thickness. The nonvoided skin(s) should thus be from 5to 85% of the sheet, preferably from 15 to 70% of the thickness.

The density (specific gravity) of the composite sheet, expressed in terms of "percent of solid density", is calculated as follows:

$$\frac{\text{Composite Sheet Density}}{\text{Polymer Density}} \times 100 = \% \text{ of Solid Density}$$

Percent solid density should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite sheet can range from 12 to 100 $\mu$m, preferably from 20 to 70 $\mu$m. Below 20 $\mu$m, the microvoided sheets may not be thick enough to minimize any inherent non-planarity in the support and would be more difficult to manufacture. At thickness higher than 70 $\mu$m, little improvement in either surface smoothness or mechanical properties is seen, and so there is little justification for the further increase in cost for extra materials.

The biaxially oriented sheets of the invention preferably have a water vapor permeability that is less than $0.85 \times 10^{-5}$ g/mm$^2$/day/atm. This allows faster emulsion hardening, as the laminated support of this invention greatly slows the rate of water vapor transmission from the emulsion layers during coating of the emulsions on the support. The transmission rate is measured by ASTM F1249.

"Void" is used herein to mean devoid of added solid and liquid matter, although it is likely the "voids" contain gas. The void-initiating particles which remain in the finished packaging sheet core should be from 0.1 to 10 $\mu$m in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, flimaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylarnidomethyl-propane sulfonic acid, vinyl toluene, etc. Preferably, the cross-linked polymer is polystyrene or poly(methyl methacrylate). Most preferably, it is polystyrene, and the cross4inking agent is divinylbenzene.

Processes well known in the art yield non-uniformly sized particles, characterized by broad particle size distributions. The resulting beads can be classified by screening the beads spanning the range of the original distribution of sizes. Other processes, such as suspension polymerization and limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads, or inorganic particles such as clay, talc, barium sulfate, and calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet on the top side toward the emulsion, suitable classes of thermoplastic polymers for the biaxially oriented sheet and the core matrix-polymer of the preferred composite sheet comprise polyolefins.

Suitable polyolefins include polypropylene, polyethylene, polymethylpentene, polystyrene, polybutylene, and mixtures thereof Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

Addenda may be added to the core matrix and/or to the skins to improve the whiteness of these sheets. Whitening addenda known in the art include adding a white pigment, such as titanium dioxide, barium sulfate, clay, or calcium carbonate. Addenda also include fluorescing agents which absorb energy in the UV region and emit light largely in the blue region, or other additives which would improve the physical properties of the sheet or the manufacturability of the sheet. For photographic use, a white base with a slight bluish tint is preferred.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The composite sheet, while described as having preferably at least three layers of a microvoided core and a skin layer on each side, may also be provided with additional layers that may serve to change the properties of the biaxially oriented sheet. A different effect may be achieved by additional layers. Such layers might contain tints, antistatic materials, or different void-making materials to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These composite sheets may be coated or treated after the coextrusion and orienting process or between casting and fall orientation with any number of coatings which may be used to improve the properties of the sheets including printability, to provide a vapor barrier, to make them heat sealable, or to improve the adhesion to the support or to the photosensitive layers. Examples of this would be acrylic coatings for printability and coating polyvinylidene chloride for heat seal properties. Further examples include flame, plasma or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a typical biaxially oriented, microvoided sheet of the invention is as follows:
 Solid skin layer
 Microvoided core layer
 Solid skin layer The sheet on the side of the base paper opposite to the emulsion layers may be any suitable sheet having the required surface roughness and mechanical properties including the invention limit as to the energy to break. The sheet may or may not be microvoided. It may have the same composition as the sheet on the top side of the paper backing material. Biaxially oriented polymer backside sheets are conveniently manufactured by coextrusion of the sheet, which may contain several layers, followed by biaxial orientation. Such biaxially oriented sheets are disclosed in, for example, U.S. Pat. No. 4,764,425, the disclosure of which is incorporated by reference.

Suitable classes of thermoplastic polymers for the backside biaxially oriented sheet core and skin layers include polyolefins, polyesters, polyarnides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyesters include those produced from aromatic, aliphatic, or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic, and mixtures thereof Examples of suitable glycols include ethylene glycol, propylene glycol, butanediol, pentanediol, hexanediol, 1,4-cyclohexanedimethanol, diethylene glycol, other polyethylene glycols and mixtures thereof Such polyesters are well known in the art and may be produced by well-known techniques, e.g., those described in U.S. Pat. Nos. 2,465,319 and 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607; 4,459,402; and 4,468,510.

Useful polyamides include nylon 6, nylon 66, and mixtures thereof Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The biaxially oriented sheet on the backside of the laminated base can be made with one or more layers of the same polymeric material, or it can be made with layers of different polymeric composition. In the case of a multiple layer system, when different polymeric materials are used, an additional layer may be required to promote adhesion between non-compatible polymeric materials so that the biaxially oriented sheets do not have layer fracture during manufacturing or in the final imaging element format.

Biaxially oriented polyolefin sheets are preferred for the backside sheet of this invention because they are low in cost and provide sufficient mechanical properties. Suitable polyolefins for the core and skin layers include polypropylene, polyethylene, polymethylpentene, and mixtures thereof Polyolefin copolymers, including copolymers of propylene and ethylene such as hexene, butene and octene are also useful. The most preferred polyolefin is polyethylene with a density of between 0.94 g/cc and 0.98 g/cc. Polyethylene with this density range is crystalline in nature and aids in the propagation of the crack that is initiated in the chopping or punching processes that are common in photofinishing equipment.

The coextrusion, quenching, orienting, and heat setting of these biaxially oriented sheets may be effected by any process which is known in the art for producing oriented sheet, such as by a flat sheet process or a bubble or tubular process. The flat sheet process involves extruding or coextruding the blend through a slit die and rapidly quenching the extruded or coextruded web upon a chilled casting drum so that the polymer component(s) of the sheet are quenched below their solidification temperature.

The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining to some degree the sheet against retraction in both directions of stretching. A typical biaxial orientation ratio for the machine direction to cross direction is 5:8. A 5:8 orientation ratio develops that mechanical properties of the biaxially oriented sheet in both the machine and cross directions. By altering the orientation ratio, the mechanical properties of the biaxially oriented sheet can be developed in just one direction or both directions. An orientation ratio that yields the desired mechanical properties of this invention is 2:8.

In the photofinishing process it is necessary that the photofinishing machines chop rolls of photographic paper into the final image format. Generally, the photofinishing equipment is only required to make chops in the cross machine direction, as the manufacturer of the imaging element has previously cut to a width that is suitable for the photofinishing machine being utilized. It is necessary that these chops in the cross direction be accurate and cleanly made. Inaccurate cuts lead to fiber projections hanging from the prints which are undesirable. The undesirable fiber projections are primarily tom backside polymer sheet and not cellulose paper fiber. Further, poor cross machine direction cutting can lead to damaging of the edges of the final image. With imaging elements containing biaxially oriented sheets in the base, the standard photofinishing machine cutters have difficulty in producing edges free of fibrous projections. Therefore, there is a need which is solved by this invention to provide a biaxially oriented sheet containing photographic element that may be cut in the cross direction by conventional cutters.

In the photofinishing process it is necessary that the photofinishing machines punch index holes into the imaging element as it moves through the machine. Inaccurate or incomplete punching of these holes will lead to undesirable results, as the machine will not image the prints in the proper place. Further, failure to properly make index punches may lead to jamming, as prints may be cut to a size which the machine cannot handle. Since punching in photographic processing equipment usually occurs from the emulsion side, the fracture mechanism of bottom of the photographic element is a combination of cracks originating from both the punch and die. With tight clearances, as in a punch and die set with less than 1,000,000 actuations, the cracks, originating from the punch ahd die edges, miss each other and the cut is completed by a secondary tearing process producing a jagged edge approximately midway in bottom sheet thickness that is a function of punch and die clearance. As the punch and die begin to wear from repeated actuations, excessive clearance is formed allowing for extensive plastic deformation of the bottom sheet. When the crack finally forms in the bottom sheet, it can miss the opposing crack, separation is delayed, and a long polymer burr can form in the punched hole. This long burr can cause unacceptable punched holes which can result in machine jams. For punching of the bottom biaxially oriented sheet of this invention, the energy to break is a significant factor in determining the quality of the punched index hole. Lowering the energy to break the bottom sheet for punching allows for punching fracture to occur at lower punch forces and aids in the reduction of punch burrs in the punched hole. The energy to break for the bottom polymer sheets of this invention is defined as the area under the stress strain curve. Energy to break is measured by running a simple tensile strength test for polymer sheets at a rate of 4000% strain per min.

For imaging materials that are chopped or for imaging materials that are punched with an index hole, energy to break of less than $3.5 \times 10^7 J/m^3$ for the bottom biaxially oriented sheet in at least one direction is preferred. A biaxially oriented polymer sheet with an energy to break greater than $4.0 \times 10^7 J/m^3$ does not show significant improvement in chopping or punching. For photographic paper that is chopped in photofinishing equipment, an energy to break of less than $3.5 \times 10^7 J/m^3$ in machine direction is preferred since the chopping usually occurs in the cross direction.

For imaging elements of this invention, the most preferred energy to break is between $9.0 \times 10^5 J/m^3$ and $3.5 \times 10^7 J/m^3$. Bottom polymer sheets with an energy to break less than $5.0 \times 10^5 J/m^3$ are expensive in that the process yield for oriented bottom sheets are reduced as lower orientation ratios are used to lower the energy to break. An energy to break greater than $4.0 \times 10^7 J/m^3$ does not show significant improvement for punching and chopping over cast low density polyethylene sheets that are commonly used as backside sheets in prior art imaging supports.

The preferred thickness of the backside biaxially oriented sheet should be from 12 to 50 $\mu$m. Below 12 $\mu$m, the sheets may not be thick enough to minimize any inherent non-planarity in the support, would be more difficult to manufacture, and would not provide enough strength to provide curl resistance to a gel containing imaging layer such as a light sensitive silver halide emulsion. At a thickness higher than 50 $\mu$m, little improvement in mechanical properties is seen, and so there is little justification for the further increase in cost for extra materials. Also at a thickness greater than 50 $\mu$m, the force to punch an index hole in the photofinishing equipment is beyond the design force of some photofinishing equipment. Failure to complete a punch will result in machine jamming and loss of photofinishing efficiency.

The surface roughness of biaxially oriented film or $R_a$ is a measure of relatively finely spaced surface irregularities, such as those produced on the backside of photographic materials by the casting of polyethylene against a rough chilled roll. The surface roughness measurement is a measure of the maximum allowable roughness height expressed in units of micrometers and by use of the symbol $R_a$. For the irregular profile of the backside of photographic materials of this invention, the average peak to valley height, which is the average of the vertical distances between the elevation of the highest peak and that of the lowest valley, is used.

Biaxially oriented polyolefin sheets commonly used in the packaging industry are commonly melt extruded and then orientated in both directions (machine direction and cross direction) to give the sheet desired mechanical strength properties. The process of biaxially orientation generally creates a surface roughness of less than 0.23 $\mu$m. While the smooth surface has value in the packaging industry, use as a backside layer for photographic paper is limited, as it does not contain the required roughness for efficient transport in photofinishing equipment and can not be easily written on. Laminated to the backside of the base paper, the biaxially oriented sheet must have a surface roughness greater than 0.30 $\mu$m to ensure efficient transport through the many types of photofinishing equipment that has been purchased and installed around the world. At surface roughness less that 0.30 $\mu$m, transport through the photofinishing equipment becomes less efficient. At surface roughness greater than 2.54 $\mu$m, the surface would become too rough, causing transport problems in photofinishing equipment, and the rough backside surface would begin to emboss the silver halide emulsion as the material is wound in rolls.

The surface roughness is accomplished by introducing addenda into the bottommost layer. The particle size of the addenda is preferably between 0.20 $\mu$m and 10 $\mu$m. At particles sizes less than 0.20 $\mu$m, the desired surface roughness cannot be obtained. At particles sizes greater than 10 $\mu$m, the addenda begins to create unwanted surface voids during the biaxially orientation process that would be unacceptable in a photographic paper application and would begin to emboss the silver halide emulsion as the material is wound in rolls. The preferred addenda to be added to the bottommost skin layer, to create the desired backside roughness, comprise a material selected from the group consisting of titanium dioxide, silica, calcium carbonate, barium sulfate, kaolin, and mixtures thereof.

Addenda may also be added to the biaxially oriented backside sheet to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet.

Another method of creating the desired roughness on the bottommost skin layer of a biaxially oriented sheet is the use of incompatible block copolymers. Block copolymers are polymers containing long stretches of two or more monomeric units linked together by chemical valences in one single chain. During the biaxially orientation of the sheet, the block copolymers do not mix and create desired surface roughness and a lower surface gloss when compared to homopolymers. The preferred block copolymers are mixtures of polyethylene and polypropylene.

A random roughness pattern is preferred on the bottommost layer of the biaxially oriented sheet. A random pattern, or one that has no particular pattern, is preferred to an ordered pattern because the random pattern best simulates the appearance and texture of cellulose paper which adds to the commercial value of a photographic image. A random pattern on the bottommost skin layer will reduce the impact of the surface roughness transferring to the image side when compared to an ordered pattern. A transferred surface roughness pattern that is random is more difficult to detect than an ordered pattern.

In order to successfully transport a photographic paper that contains a laminated biaxially oriented sheet with the desired surface roughness on the opposite side of the image layer, an antistatic coating on the bottommost layer is preferred. The antistat coating may contain any known materials known in the art which are coated on photographic web materials to reduce static during the transport of photographic paper. The preferred surface resistivity of the antistat coat at 50% RH is less than $10^{-12}$ ohm/square.

These biaxially oriented sheets may be coated or treated after the coextrusion and orienting process or between casting and fall orientation with any number of coatings which may be used to improve the properties of the sheets including printability, to provide a vapor barrier, to make them heat sealable, or to improve the adhesion to the support or to the photosensitive layers. Examples of this would be acrylic coatings for printability and coating polyvinylidene chloride for heat seal properties. Further examples include flame, plasma, or corona discharge treatment to improve printability or adhesion.

The structure of a typical biaxially oriented backside sheet of this invention with the skin layer on the bottom of the photographic element and the solid core laminated to the raw base is as follows:

Solid core containing one or more layers

Skin layer

The support to which the microvoided composite sheets and biaxially oriented sheets are laminated for the laminated support of the photosensitive silver halide layer may be a polymeric, a synthetic paper, cloth, woven polymer fibers, or a cellulose fiber paper support, or laminates thereof The base also may be a microvoided polyethylene terephalate such as disclosed in U.S. Pat. Nos. 4,912,333; 4,994,312; and 5,055,371.

The preferred support is a photographic grade cellulose fiber paper. When using a cellulose fiber paper support, it is preferable to extrusion laminate the microvoided composite sheets to the base paper using a polyolefin resin. Extrusion laminating is carried out by bringing together the biaxially oriented sheets of the invention and the base paper with application of an adhesive between them, followed by their being pressed in a nip such as between two rollers. The adhesive may be applied to either the biaxially oriented sheets or the base paper prior to their being brought into the nip. In a preferred form the adhesive is applied into the nip simultaneously with the biaxially oriented sheets and the base paper. The adhesive may be any suitable material that does not have a harmful effect upon the photographic element. A preferred material is polyethylene that is melted at the time it is placed into the nip between the paper and the biaxially oriented sheet.

During the lamination process, it is desirable to maintain control of the tension of the biaxially oriented sheet(s) in order to minimize curl in the resulting laminated support. For high humidity applications (>50% RH) and low humidity applications (<20% RH), it is desirable to laminate both a front side and backside film to keep curl to a minimum.

In one preferred embodiment, in order to produce photographic elements with a desirable photographic look and feel, it is preferable to use relatively thick paper supports (e.g., at least 120 mm thick, preferably from 120 to 250 mm thick) and relatively thin microvoided composite sheets (e.g., less than 50 mm thick, preferably from 20 to 50 mm thick, more preferably from 30 to 50 mm thick).

As used herein, the phrase "imaging element" is a material that may be used as a laminated support for the transfer of images to the support by techniques such as ink jet printing or thermal dye transfer, as well as a support for silver halide images. As used herein, the phrase "photographic element" is a material that utilizes photosensitive silver halide in the formation of images. In the case of thermal dye transfer or ink jet, the image layer that is coated on the imaging element may be any material that is known in the art such as gelatin, pigmented latex, polyvinyl alcohol, polycarbonate, polyvinyl pyrrolidone, starch, and methacrylate. The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as sulfur-containing compounds, e.g., allyl isothiocyanate, sodium thiosulfate, and allyl thiourea; reducing agents, e.g., polyamines and stannous salts; noble metal compounds, e.g., gold and platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating, and extrusion coating.

The silver halide emulsions utilized in this invention may be comprised of any halide distribution. Thus, they may be comprised of silver chloride, silver chloroiodide, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride, and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic*

*Process*, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives, tin compounds, polyamine compounds, and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 Al (Yamashita), EP 0 369 491 (Yamashita), EP 0 371 388 (Ohashi), EP 0 396 424 Al (Takada), EP 0 404 142 Al (Yamada), and EP 0 435 355 Al (Makino).

The photographic elements of this invention may use emulsions doped with Group VIII metals such as iridium, rhodium, osmium, and iron as described in *Research Disclosure*, September 1996, Item 38957, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black-and-white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 $\mu$m.

Couplers suitable for the photographic elements of the invention are disclosed at pages 613–617 of *Research Disclosure* 40145.

In the following Table, reference will be made to (1) *Research Disclosure*, December 1978, Item 17643, (2) *Research Disclosure*, December 1989, Item 308119, and (3) *Research Disclosure*, September 1996, Item 38957, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing, and manipulating the elements and the images contained therein.

| Reference | Section | Subject Matter |
|---|---|---|
| 1 | I, II | Grain composition, |
| 2 | I, II, IX, X, XI, XII, XIV, XV | morphology, and preparation. Emulsion preparation including |
| 3 | I, II, III, IX A & B | hardeners, coating aids, addenda, etc. |
| 1 | III, IV | Chemical sensitization and |
| 2 | III, IV | spectral sensitization/ |
| 3 | IV, V | desensitization |
| 1 | V | UV dyes, optical brighteners, |
| 2 | V | luminescent dyes |
| 3 | VI | |
| 1 | VI | |
| 2 | VI | Antifoggants and stabilizers |
| 3 | VII | |
| 1 | VIII | |
| 2 | VIII, XIII, XVI | Absorbing and scattering materials; Antistatic layers; |
| 3 | VIII, IX C & D | matting agents |
| 1 | VII | Image-couplers and image- |
| 2 | VII | modifying couplers; Dye |
| 3 | X | stabilizers and hue modifiers |
| 1 | XVII | |
| 2 | XVII | Supports |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | |
| 2 | XIX, XX, XXII | Chemical processing; Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum, as well as with electron beam, beta radiation, gamma radiation, X ray, alpha particle, neutron radiation, and other forms of corpuscular and wave-like radiant energy in either noncoherent (random phase) forms or coherent (in phase) forms, as produced by lasers. When the photographic elements are intended to be exposed by X rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4™ (Eastman Kodak Company) Process or other processing systems suitable for developing high chloride emulsions.

The laminated substrate of the invention may have copy restriction features incorporated such as disclosed in U.S. patent application Ser. No. 08/598,785 filed Feb. 8, 1996 and application Ser. No. 08/598,778 filed on the same day. These applications disclose rendering a document copy restrictive by embedding into the document a pattern of invisible microdots. These microdots are, however, detectable by the electro-optical scanning device of a digital document copier. The pattern of microdots may be incorporated throughout the document. Such documents may also have colored edges or an invisible microdot pattern on the backside to enable users or machines to read and identify the media. The media may take the form of sheets that are capable of bearing an image. Typical of such materials are photographic paper and film materials composed of polyethylene resin coated paper, polyester, (poly)ethylene naphthalate, and cellulose triacetate based materials.

The microdots can take any regular or irregular shape with a size smaller than the maximum size at which individual microdots are perceived sufficiently to decrease the usefulness of the image, and the minimum level is defined by the detection level of the scanning device. The microdots may be distributed in a regular or irregular array with center-to-center spacing controlled to avoid increases in document density. The microdots can be of any hue, brightness, and saturation that does not lead to sufficient detection by casual observation, but preferably of a hue least resolvable by the human eye, yet suitable to conform to the sensitivities of the document scanning device for optimal detection.

In one embodiment the information-bearing document is comprised of a support, an image-forming layer coated on the support, and a pattern of microdots positioned between the support and the image-forming layer to provide a copy restrictive medium. Incorporation of the microdot pattern into the document medium can be achieved by various printing technologies either before or after production of the original document. The microdots can be composed of any colored substance, although depending on the nature of the document, the colorants may be translucent, transparent, or opaque. It is preferred to locate the microdot pattern on the support layer prior to application of the protective layer, unless the protective layer contains light scattering pigments. Then the microdots should be located above such layers and preferably coated with a protective layer. The microdots can be composed of colorants chosen from image dyes and filter dyes known in the photographic art and dispersed in a binder or carrier used for printing inks or light-sensitive media.

In a preferred embodiment the creation of the microdot pattern as a latent image is possible through appropriate temporal, spatial, and spectral exposure of the photosensitive materials to visible or non-visible wavelengths of electromagnetic radiation. The latent image microdot pattern can be rendered detectable by employing standard photographic chemical processing. The microdots are particularly useful for both color and black-and-white image-forming photographic media. Such photographic media will contain at least one silver halide radiation sensitive layer, although typically such photographic media contain at least three silver halide radiation sensitive layers. It is also possible that such media contain more than one layer sensitive to the same region of radiation. The arrangement of the layers may take any of the forms known to one skilled in the art, as discussed in Research Disclosure 37038 of February 1995.

Commercial Grade Paper of Examples

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 5.0% $TiO_2$ on a dry weight basis. An about 46.5 lbs. per 1000 sq. ft. (ksf) bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc.

The following examples illustrate the practice of this invention. They are not intended to be exhaustive of all possible variations of the invention. Parts and percentages are by weight unless otherwise indicated.

EXAMPLES

Example 1

The following laminated photographic bases in Table 1 were prepared by extrusion laminating one biaxially oriented, microvoided sheet to the emulsion side of the photographic grade cellulose paper base. Various biaxially oriented sheets with different levels of energy to break were laminated to the backside of the photographic grade cellulose paper base.

The following biaxially oriented, microvoided sheet was laminated to the emulsion side of a photographic grade cellulose paper base:

Top sheet: (Emulsion side)

OPPalyte 350 ASW (Mobil Chemical Co.), a composite sheet (31 mm thick) (d=0.68 g/cc) consisting of a microvoided and oriented polypropylene core (approximately 60% of the total sheet thickness), with a homopolyrner non-microvoided oriented polypropylene layer on each side; the void initiating material used is poly(butylene terephthalate).

The following biaxially oriented sheets were then laminated to the backside of the photographic grade cellulose paper base creating photographic bases A-C:

Photographic paper base A:

BICOR 70 MLT (Mobil Chemical Co.), a one-side matte finish, one-side treated biaxially oriented polypropylene sheet (18 mm thick) (d=0.9 g/cc) consisting of a solid oriented polypropylene core and a skin layer of a mixture of polyethylenes and a terpolymer of ethylene-propylene-butylene with a orientation ratio of 5:8. Polypropylene core side was laminated to the cellulose paper exposing the skin layer of block copolymer.

Photographic paper base B:

A one-side matte finish, one-side treated biaxially oriented high density polyethylene sheet (18 mm thick) (d=0.95 g/cc) consisting of a solid core of high density polyethylene and a skin layer of a block copolymer of polyethylene and polypropylene with a orientation ratio of 5:8. Polypropylene core side was laminated to the cellulose paper exposing the skin layer of block copolymer.

Photographic paper base C:

A one-side matte finish, one-side treated biaxially oriented high density polyethylene sheet (I18 mm thick) (d=0.95 g/cc) consisting of a solid core of high density polyethylene and a skin layer of a block copolymer of polyethylene and polypropylene with a orientation ratio of 2:8. Polypropylene core side was laminated to the cellulose paper exposing the skin layer of block copolymer.

The structure below shows the construction of the paper bases A-C used in this example:

OPPalyte 350 ASW
Resin bonding layer
Cellulose paper base
Resin bonding layer
Bottom oriented polymer sheet Photographic base D is traditional light sensitive color silver halide paper support that was used as a control in this example. Base d was prepared by melt extrusion coating cellulose paper base using 1924P Low Density Polyethylene (Eastman Chemical Co.) against a roulgh chilled roll. 1924P is an extrusion grade low density polyethylene with a density of 0.923 g/cm$^3$ and a melt index of 4.2.

Prior to lamination the energy to break was evaluated for each bottom sheet for photographic bases A-C in both the machine and cross directions. The energy to break for the backside of traditional photographic paper (base D) was accomplished by casting the 1924P low density polyethylene as a single sheet against a chilled roll and testing the polyethylene sheet along with the bottom sheets from bases A-C. The energy to break is the area under the stress strain curve measured by running a standard tensile test on an Instron at a rate of 4000% strain per min expressed in units of J/m$^3$. The results from the energy to break test are tabulated in Table 1, and the units for energy to break are x 10$^6$J/m$^3$.

TABLE 1

| Base Variations | Cross Direction Energy to Break | Machine Direction Energy to Break |
|---|---|---|
| A | 31.4 | 59.4 |
| B | 31.2 | 79.9 |
| C | 26.0 | 1.4 |
| D | 63.2 | 40.1 |

Table 1 shows the energy to break for the bottom polymer sheets (prior to lamination) used to construct photographic bases A-D. The results show significant differences in the energy to break the bottom polymer sheets. The energy to break sheets A and B are typical of biaxially oriented sheets with a machine direction orientation of 400% to 800% of the original length. The lower energy to break sheet C is the result of decreasing the orientation in the machine direction to 150% of the original length. Sheet D was the control for this example and is representative of prior art materials. Since sheet D was cast against a chilled roll, it is not significantly oriented in either the machine or cross direction.

Photographic bases A-D were emulsion coated using coating format 1 detailed below:

| Coating Format 1 | | Laydown mg/m$^2$ |
|---|---|---|
| Layer 1 | Blue Sensitive | |
| | Gelatin | 1300 |
| | Blue sensitive silver | 200 |
| | Y-1 | 440 |
| | ST-1 | 440 |
| | S-1 | 190 |
| Layer 2 | Interlayer | |
| | Gelatin | 650 |
| | SC-1 | 55 |
| | S-1 | 160 |
| Layer 3 | Green Sensitive | |
| | Gelatin | 1100 |
| | Green sensitive | 70 |
| | M-1 | 270 |
| | S-1 | 75 |
| | S-2 | 32 |
| | ST-2 | 20 |
| | ST-3 | 165 |
| | ST-4 | 530 |
| Layer 4 | UV Interlayer | |
| | Gelatin | 635 |
| | UV-1 | 30 |
| | UV-2 | 160 |
| | SC-1 | 50 |
| | S-3 | 30 |
| | S-1 | 30 |
| Layer 5 | Red Sensitive | |
| | Gelatin | 1200 |
| | Red sensitive silver | 170 |
| | C-1 | 365 |
| | S-1 | 360 |
| | UV-2 | 235 |
| | S-4 | 30 |
| | SC-1 | 3 |
| Layer 6 | UV Overcoat | |
| | Gelatin | 440 |
| | UV-1 | 20 |
| | UV-2 | 110 |
| | SC-1 | 30 |
| | S-3 | 20 |
| | S-1 | 20 |
| Layer 7 | SOC | |
| | Gelatin | 490 |
| | SC-1 | 17 |
| | SiO$_2$ | 200 |
| | Surfactant | 2 |

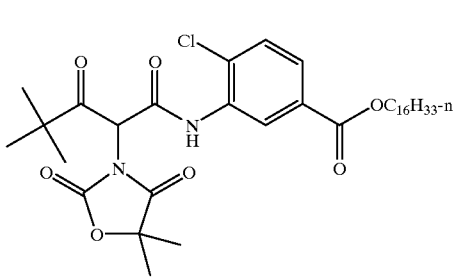

Y-1

ST-1=N-tert-butylacrylamide/n-butyl acrylate copolymer (50:50)

S-1=dibutyl phthalate

SC-1

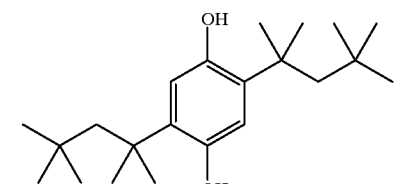

M-1

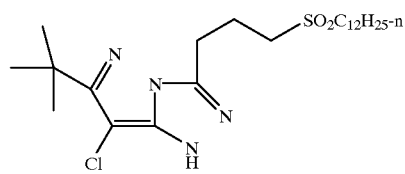

S-2=diundecyl phthalate

ST-2

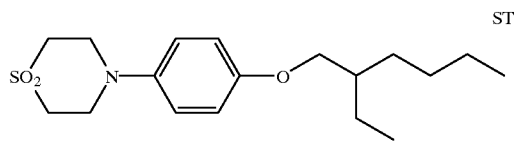

ST-3

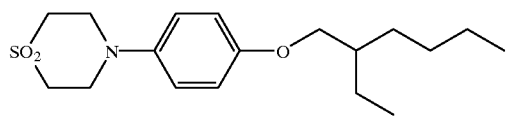

ST-4

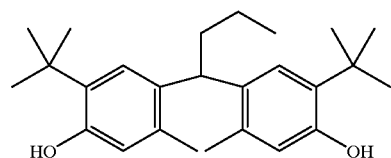

UV-1

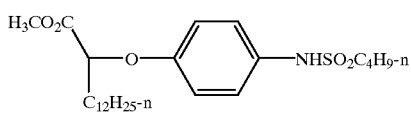

UV-2

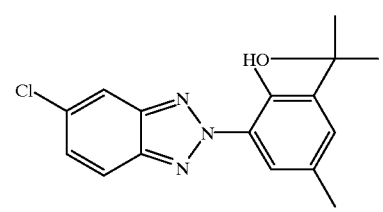

S-3=1,4-Cyclohexyldimethylene bis(2-ethylhexanoate)

C-1

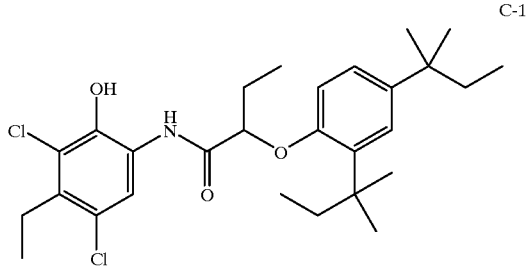

S-4=2-(2-Butoxyethoxy)ethyl acetate

Dye 1

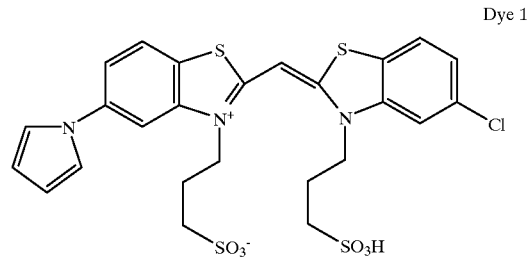

Photographic elements A–D were slit into 10 cm rolls and were run on a Gretag Masterlab 750 mini lab and converted into consumer images. The Gretag 750 Masterlab is equipped with a slow speed rotary knife to chop images into the final consumer format. The knife used in this test had made 500,000 actuations just prior to the test. The chopped edge of 500 prints was inspected for chop quality and the presence of fibrous projections. Chop quality ratings of "excellent" and "good" are acceptable. Chop quality ratings of "fair" and "poor" are unacceptable. Unacceptable fibrous projections are hair like pieces of bottom sheet that extend beyond the chopped edge of the image and are visible with the human eye. Results from the test are listed in Table 2 below:

TABLE 2

| Base Variations | Chop Quality | Unacceptable Fibrous Projections |
|---|---|---|
| A | Good | Yes |
| B | Good | Yes |
| C (invention) | Excellent | No |
| D (control) | Good | No |

The results from the chopping test show that the machine direction energy to break has a significant effect on the chop quality of a consumer image. As the energy to break in the machine direction for the bottom sheet in Base C was reduced to $1.4 \times 10^6 J/m^3$, the fibrous projections were eliminated when compared to standard biaxially oriented bottom sheets as in Base A and B. Additionally, by reducing the energy to break below traditional cast polyethylene bottom sheets, the chopped quality is improved suggesting that an improvement in image chop quality, which improves the commercial value of an image, is obtained when compared to traditional photographic base materials. Additionally, since the chop quality was improved from good to excellent by lowering the energy to break beyond traditional photographic paper (base D), the life of the chopping mechanism can be extended by using bottom sheets with low energy to break, thus reducing the frequency of expensive chopping knife changes in photofinishing equipment.

The same 10 cm slit rolls of Photographic elements A–D were run on a Kodak 312 Printer and converted into consumer images. The Kodak 312 printer is equipped with a pneumatic 1.5 mm ID punch to punch index holes. The punch used in this test had made 1,000,000 actuations just prior to the test. The inside diameter of the punch holes was measured and the quality of the punched hole noted. A punch quality rating of "excellent" and "good" are acceptable. Punch quality ratings of "fair" and "poor" are unacceptable, and papers with such a rating are known to cause machine jams. Results from the chopping test are listed in Table 3 below:

TABLE 3

| Base Variations | Punched Hole Diameter (mm) | Punched Hole Quality |
|---|---|---|
| A | 2.2 | Fair |
| B | 2.1 | Fair |
| C (invention) | 1.5 | Excellent |
| D (control) | 1.7 | Good |

The results from the punching test show the significant improvement in hole diameter and punched hole quality when compared to traditional biaxially oriented bottom sheets (base variation A and B) and even traditional photographic base materials (base variation D). Since the punch diameter used in this test was 1.5 mm, punch hole diameters larger than 1.5 mm indicate tearing and punch retraction problems. The hole diameter and punch hole quality were improved by reducing the energy to break the bottom polymer sheet. This improvement is significant, as the reliability of the index punching operation can be improved in photofinishing equipment by using a bottom sheet that has an energy to break less than $3.5 \times 10^7 J/m^3$. This improvement could also extend the operational life of punching mechanisms in photofinishing equipment and reduce the expensive downtime required to change a punching mechanism because the hole diameter was improved by lowering the energy to break the bottom sheet.

The invention has been described in detail with particular reference to certain preferred embodiments thereof, but it will be understood that variations and modifications can be effected within the spirit and scope of the invention.

What is claimed is:

1. An imaging element comprising a laminated base structure wherein said base structure comprises a paper having laminated to the upper side an upper biaxially oriented polyolefin sheet and laminated to the lower side of said paper a lower side biaxially oriented polymer sheet wherein said lower side biaxially oriented polymer sheet has an energy to break of less than $3.5 \times 10^7 J/m^3$ in at least one direction.

2. The imaging element of claim 1 wherein said lower side biaxially oriented polymer sheet comprises a biaxially oriented polyolefin.

3. The imaging element of claim 1 wherein said lower side sheet has a thickness of between 12 $\mu$m and 50 $\mu$m.

4. The imaging element of claim 2 wherein said lower side sheet has a thickness of between 20 $\mu$m and 32 $\mu$m.

5. The imaging element of claim 2 wherein said polyolefin comprises high density polyethylene having a density of between about 0.94 to 0.98 grams per cc.

6. The imaging element of claim 1 wherein said lower side sheet has a lower surface roughness of between 0.30 $\mu$m and 2.00 $\mu$m.

7. The imaging element of claim 1 wherein said energy to break is in the machine direction.

8. The imaging element of claim 1 wherein energy to break is between $9.0 \times 10^5 J/m^3$ and $3.5 \times 10^7 J/m^3$.

9. A photographic element comprising at least one silver halide photosensitive layer and a laminated base material comprising a paper having laminated to the upper side of said paper an upper biaxially oriented polyolefin sheet and laminated to the lower side of said paper a lower biaxially oriented polymer sheet wherein said lower side biaxially oriented polymer sheet has an energy to break of less than $3.5 \times 10^7 J/m^3$.

10. The photographic element of claim 9 wherein said lower side biaxially oriented polymer sheet comprises a biaxially oriented polyolefin.

11. The photographic element of claim 9 wherein said lower side sheet has a thickness of between 12 $\mu$m and 50 $\mu$m.

12. The photographic element of claim 10 wherein said lower side sheet has a thickness of between 20 $\mu$m and 32 $\mu$m.

13. The photographic element of claim 10 wherein said polyolefin comprises high density polyethylene having a density of between about 0.94 to 0.98 grams per cc.

14. The photographic element of claim 9 wherein said lower side sheet has a lower surface roughness of between 0.30 $\mu$m and 2.00 $\mu$m.

15. The photographic element of claim 9 wherein said energy to break is in the machine direction.

16. The photographic element of claim 9 wherein energy to break is between $9.0 \times 10^5 J/m^3$ and $3.5 \times 10^7 J/m^3$.

17. The photographic element of claim 1 wherein said at least one photographic layer comprises a layer sensitive to green light and containing a magenta dye forming coupler, a layer sensitive to red light containing a cyan dye forming color, and a layer sensitive to blue light containing a yellow dye forming coupler.

18. The imaging element of claim 1 wherein said paper comprises a cellulose fiber paper.

19. The imaging element of claim 9 wherein said paper comprises a cellulose fiber paper.

* * * * *